United States Patent [19]

Kitai

[11] 3,851,170
[45] Nov. 26, 1974

[54] DEVICE FOR SIMULTANEOUSLY DISPLAYING THE DENSITIES OF BASIC COLORS OF A COLOR ORIGINAL

[75] Inventor: Makoto Kitai, Kyoto, Japan

[73] Assignee: Dainippon Screen Seizo Kabushiki Kaisha, Kyoto, Japan

[22] Filed: June 13, 1973

[21] Appl. No.: 369,548

[52] U.S. Cl. ............... 250/226, 250/206, 356/188
[51] Int. Cl. ............................................. G01j 3/50
[58] Field of Search .......... 356/173, 174, 176, 177, 356/179, 188, 199; 250/226, 206, 214 R, 233

[56] References Cited
UNITED STATES PATENTS

| | | | |
|---|---|---|---|
| 3,694,092 | 9/1972 | Hashimoto et al. | 250/226 X |
| 3,697,185 | 10/1972 | Kassel et al. | 356/188 X |
| 3,706,497 | 12/1972 | Lindberg | 250/226 X |
| 3,743,426 | 7/1973 | Steinberg | 356/188 X |

*Primary Examiner*—Walter Stolwein
*Attorney, Agent, or Firm*—Cantor & Kraft

[57] ABSTRACT

Method and device for simultaneously displaying the densities of basic colors of a color original. The color original is scanned based on a time sharing method and sampled to obtain a density signal corresponding to the color scanned. The density signal is then converted to a digital signal for storing and for displaying until a subsequent sampling signal is obtained.

1 Claim, 7 Drawing Figures

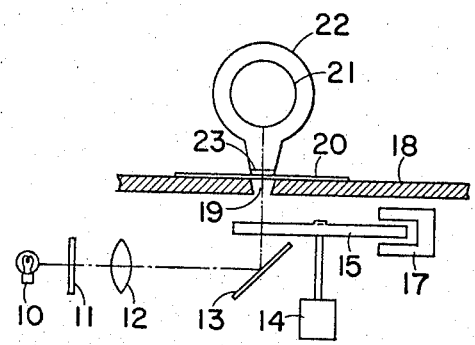
FIG. 1
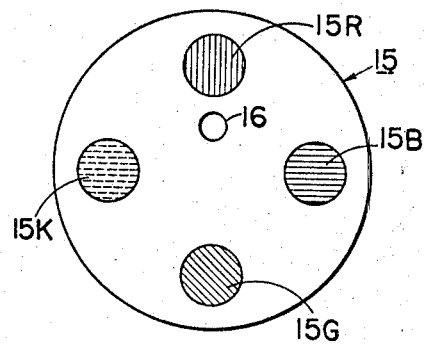
FIG. 2
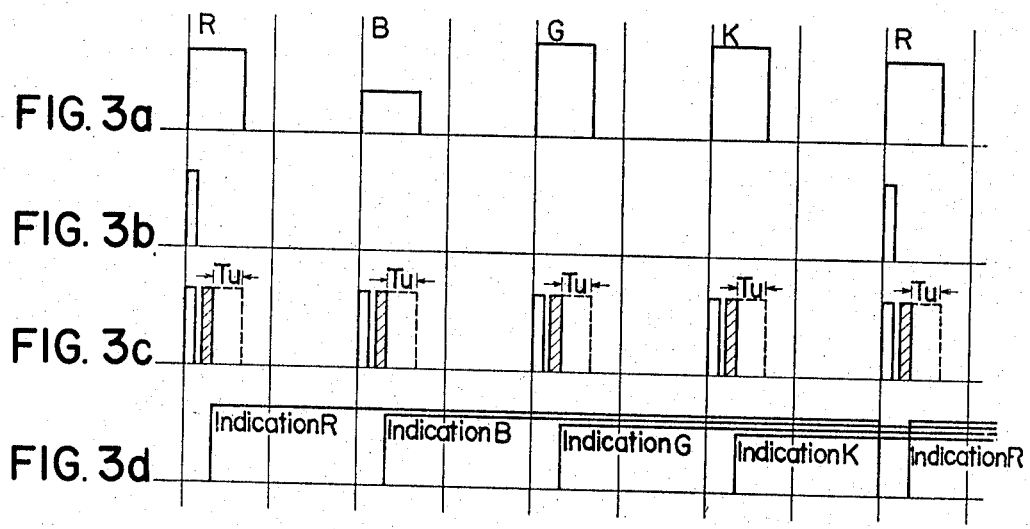
FIG. 3a
FIG. 3b
FIG. 3c
FIG. 3d
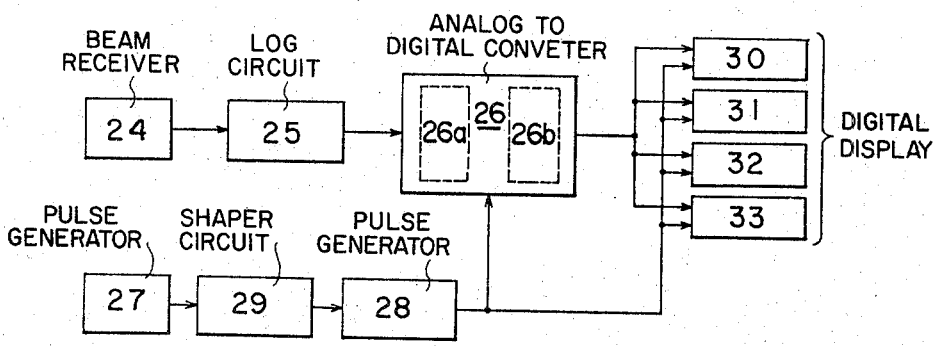
FIG. 4

DEVICE FOR SIMULTANEOUSLY DISPLAYING THE DENSITIES OF BASIC COLORS OF A COLOR ORIGINAL

BACKGROUND OF THE INVENTION

This invention relates to a method and a device for displaying the densities of monochrome and color originals and, more particularly to means for simultaneously displaying the densities of each of the basic colors such as red, blue and green for the color originals.

When measuring the color densities of color photographs color prints, etc., the conventional color density meter used has required that the color filters set to the respective positions in the beam receiving means of the densitometer are replaced by the filters corresponding to the desired color tone for the measurement of the density of that color tone, and when the density of the other color tone is measured, it has also required the successive replacement of the above color filters for the same reason as aforementioned in order for normal measurement. Therefore, as the number of color tones to be measured increases, the above color filters must be more frequently replaced. This tedious replacement procedure decreases the measuring efficiency of conventional densitometers.

SUMMARY OF THE INVENTION

An object of the present invention is to overcome the above mentioned disadvantage of a conventional densitometer, and to provide a density display method and a device which are capable of measuring both the densities of monochrome and color originals, and further to provide a density display method and a device especially designed for color originals, which are capable of simultaneous displaying of the densities of basic colors such as red, blue and green.

BRIEF DESCRIPTION OF THE DRAWINGS

For a further understanding of the invention, reference is had to the following description taken in connection with the accompanying drawings. The drawings illustrate an example of one embodiment of the invention only and thus the present invention is not limited to the drawings and the description thereof as detailed hereinafter. In the drawings:

FIG. 1 is a sectional view showing the beam receiving section in the device embodying the invention.

FIG. 2 is an enlarged plane view of the filter disk of FIG. 1.

FIGS. 3a–d are signal diagrams showing the timing chart of operation.

FIG. 4 is a block diagram showing the circuits of the device.

DETAILED DESCRIPTION OF PREFERRED EMBODIMENTS

Now referring to the drawings, FIG. 1 shows the beam receiving portion of a transparency type densitometer provided with a disk to which the respective color filters are mounted instead of a conventional color filter replacing device. The reference numeral 10 of FIG. 1 represents a light source for transparency. Likewise, reference 11 denotes a heat absorption filter; 12 a condenser lens; 13 a reflection mirror; and reference 14 represents a motor for stable rotation of a filter disk 15, respectively. As the magnified plan view shows in FIG. 2, the filter disk 15 is provided with a red filter 15R, a blue filter 15B, a green filter 15G and a monochrome filter 15K along its circumference, while at the portion near its center, it is also provided with a slit 16 to be used for a start pulse.

Referring back to FIG. 1, numeral 17 represents a timing pulse extraction photoelectric switch arranged on the same circumference as that for each filter provided on the above filter disk 15, numeral 18 is an original mounting support provided with a beam receiving slit 19 which permits the beam emitted from the aforementioned light source 10 to pass through the proper portion of the original on the mounting support 18; 20 is an original placed on the support 18 covering the slit 19 on it; 21 is a photoelectric tube equipped at a proper interval in the beam receiving section 22; and the numeral 23 is an opal plate used for beam dispersion.

FIG. 4 is a block diagram showing the operation of a device embodied according to the present invention. Numeral 24 is a beam receiving section consisting of for example a photoelectric tube. Numeral 25 is a logarithmic circuit for converting an input signal from the beam receiving section 24 into density signal. Numeral 26 is a digial converter for converting the density signal (analogue signal) provided from the logarithmic circuit 25 into a digital signal. This converter includes an input multiplexer which distributes the successively supplied density signals depending upon their color tones and an analogue-to-digital converter which changes an analogue into a digital signal. The numeral 27 is a photoelectric switch which generates the timing pulse of the reset pulse and the trigger pulse (marked with oblique lines) shown in FIG. 3 a in cooperation with a driving pulse generator 28. The numeral 29 is a waveform shaping circuit. The numerals 30, 31, 32 and 33 represent the display sections of digital densities of red, blue, green and monochrome colors, respectively.

Now the operation of the device of the present invention is as follows. When the filter disk 15 set in the beam receiving section of FIG. 1 is rotated the density signals, R, B, G or K as shown in a of FIG. 3, which is being color scanned based on the time sharing method can be obtained through the beam receiving section 24 such as a photoelectric tube and the logarithmic circuit 25. Further through the slit 16, the start pulse, as shown in b of FIG. 3, which actuates this device can also be obtained.

The above density signals R, B, G or K are transmitted to the digital converter 26, while the timing signal produced with the photoelectric switch 17 of FIG. 1 (corresponding to the switch 27 of FIG. 4) passes to the driving pulse generator 28 via the waveform shaping circuit 29, and this causes the reset pulse to be generated as shown in c of FIG. 3 in synchronization with the density signals corresponding to each color scanned based on the time sharing method as aforementioned, and this also causes the generation of the trigger pulse (marked with oblique lines in c of FIG. 3) a little delayed to the reset pulse generation. This trigger pulse is used for sampling (Tu . . . sampling time) of the above-mentioned density signal. After the density signal is converted into digital signal, this digital-converted sampling signal is supplied to the digital density display sections 30, 31, 32 and 33 which operate in synchronization with that trigger pulse, so that the required density is displayed there in digital value.

if the above digital display sections are provided with storage functions, they will maintain the displayed density value until the filter disk 15 is rotated once and is reset by the next reset pulse. Therefore, the density value is always displayed in the display section with high stability free from disturbing flicker.

As above described, according to the present invention, the tedious color filter replacement for each color to be measured as a conventional densitometer has required becomes needless in measurement of color original. As a plurality of color densities can be simultaneously displayed, the measuring error will be minimized. As well as a color original, a monochrome original can also be measured. A very low cost multicolor density display device may be provided, since the invention makes it possible that the combination of an analogue-to-digital converter and one multiplexer is sufficient for displaying the densities of several color tones.

I claim:

1. A multi-color density display device for color scanning an original comprising: a light source for emitting a beam of light; a photoelectric converter; a densitometer disposed between the light source and the original, so that the beam from the light source enters said photoelectric converter after passing through the original, said densitometer having a color-filter disk rotatably mounted therein which disk has a plurality of color scanning filters and monochrome filters arranged along the circumference at predetermined regular intervals so as to permit the beam of light to respectively pass therethrough prior to entrance to said photoelectric converter which thereupon provides output signals representative thereof; a density converter coupled to said photoelectric converter for converting said output signals into color-density signals each corresponding to the color being scanned; a plurality of photoelectric switches operatively disposed in relation to the upper and lower sides of the filters on said color-filter disk; a waveform shaping circuit coupled to said photoelectric switches for shaping a timing signal emitted from said photoelectric switches representative of the rotational movements of said disc; a driving pulse generator coupled to said waveform shaping circuit for generating trigger pulses and reset pulses corresponding to each color being scanned, from the timing signals applied to the waveform shaping circuit; a digital converter operatively coupled to said density converter and said pulse generator for sampling each of said color-density signals with respective corresponding ones of said trigger pulses for converting said color-density signals into digital signals; and a digital display means operatively coupled to said digital converter and said pulse generator for displaying each of said color-density signals in synchronization with corresponding ones of said trigger pulses fed thereto, each corresponding one of said digital signals being maintained in said display means until reset by a reset signal from said pulse generator corresponding to a subsequent color being scanned.

* * * * *